United States Patent
Yoshioka et al.

(10) Patent No.: US 6,958,000 B2
(45) Date of Patent: Oct. 25, 2005

(54) FINISHING WHEEL HOLDING MECHANISM FOR GEAR FINISHING APPARATUS

(75) Inventors: Norihiro Yoshioka, Amagasaki (JP); Koji Kawamoto, Amagasaki (JP); Masaaki Yamaguchi, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 10/951,717

(22) Filed: Sep. 29, 2004

(65) Prior Publication Data

US 2005/0075050 A1    Apr. 7, 2005

(30) Foreign Application Priority Data

Oct. 1, 2003    (JP) ............................ 2003-343179

(51) Int. Cl.⁷ ............................................. B24B 33/04
(52) U.S. Cl. ............................. 451/11; 451/47; 409/55
(58) Field of Search ................... 451/47, 11, 5, 114, 451/360, 180; 409/55, 37, 40, 49; 72/102

(56) References Cited

U.S. PATENT DOCUMENTS

| | | | | |
|---|---|---|---|---|
| 2,228,967 | A | * | 1/1941 | Miller ........................ 76/115 |
| 5,347,760 | A | * | 9/1994 | Miyauch et al. ............ 451/114 |
| 5,443,338 | A | * | 8/1995 | Huber et al. ................. 409/7 |
| 5,591,065 | A | * | 1/1997 | Mizuno et al. .............. 451/47 |
| 5,615,982 | A | * | 4/1997 | Mihara et al. ............... 409/55 |
| 6,497,610 | B1 | * | 12/2002 | Reichert ........................ 451/5 |

FOREIGN PATENT DOCUMENTS

JP    7-24634    1/1995

* cited by examiner

Primary Examiner—Robert A. Rose
(74) Attorney, Agent, or Firm—Armstrong, Kratz, Quintos, Hanson & Brooks, LLP

(57) ABSTRACT

A finishing wheel holding mechanism for a gear finishing apparatus using a finishing wheel having internal teeth, which permits simple and quick fitting or replacement of a finishing wheel is provided. The finishing wheel holding mechanism comprises a head frame 21 having at the center an opening portion for holding a finishing wheel, and an annular finishing wheel holder portion 22 for fitting finishing wheels A1 (A2), supported rotatablly within the opening portion of the head frame 21; and the finishing wheel holder comprises a support gear 50 having an open end portion 53 for finishing wheel insertion and an accepting portion 54 for fixing the finishing wheel, an annular shifting body 55 within the open end portion 53, a projection 57 contacting the finishing wheel to serve as a stopper, a pressing collar 58 inserted into the shifting body 55 to fix the finishing wheel by sliding the shifting body toward the finishing wheel, and an actuator 60 for driving the shifting body 55 toward the accepting portion.

7 Claims, 9 Drawing Sheets

FINISHING WHEEL HOLDING MECHANISM FOR GEAR FINISHING APPARATUS

BACKGROUND OF THE INVENTION

1. Field of the Invention

The present invention relates to a finishing wheel holding mechanism for use in gear finishing apparatuses, such as a honing apparatus and a shaving apparatus, in which a finishing wheel having internal teeth is rotated so as to finish a gear piece in mesh with the finishing wheel.

2. Description of the Related Art

Where a highly accurate tooth profile is required for a gear, finish processing to modify any deformation of the gear having gone through heat treatment, so-called honing, is performed. This finish processing is accomplished by rotating the gear piece to be worked upon in a state in which it is meshed with a finishing wheel having internal teeth at a predetermined crossing angle. The finishing wheel is held by a support gear of a finishing wheel holding mechanism having external peripheral teeth. The support gear is turned by a driving device in mesh with the external peripheral teeth, and is slid by a sliding section for cutting into the gear piece to be worked. Until the correction of the tooth profile is completed, each tooth of the finishing wheel contacts the teeth of the gear piece to be worked repeatedly usually as many as 20 to 200 times. Accordingly, the lifetime of the finishing wheel is generally short.

A typical gear finishing apparatus according to the prior art has only one finishing wheel for each support gear. Therefore, the apparatus has to be suspended from operation every time the finishing wheel has worn out and needs to be replaced with a new one. Fitting a finishing wheel requires not only a high level of dimensional accuracy and careful operation of fitting but also dressing after the fitting to correct errors in the fitting position of the finishing wheel, which are due to inevitable gaps occurring in the fitting work. Therefore, the time taken for finishing wheel replacement constitutes a high proportion of the overall process time of gear finishing, and accordingly its shortening and simplification of the procedure have been called for.

To meet this requirement, the present applicants proposed the gear finishing apparatus described below (Japanese Unexamined Patent Publication No. 7-24634). This gear finishing apparatus holds a plurality of finishing wheels in parallel by a finishing wheel holding mechanism, positions the finishing wheels at a crossing angle relative to a work (gear piece to be worked), and can slide in parallel to the axes of the finishing wheels and fix the work. The finishing wheels are rotated by a driving device fitted to the finishing wheel holding mechanism. The work is held by a pair of tail stocks on the base portion of the gear finishing apparatus. This gear finishing apparatus performs a synchronous operation, in which the work is rotated by a drive motor attached to one of the tail stocks. The finishing wheel holding mechanism is slid in the cutting direction and finishes the work. In this gear finishing apparatus, if the plurality of finishing wheels are fitted to the finishing wheel holding mechanism and positionally adjusted at the outset, a new, already positionally adjusted finishing wheel can be brought to its working position by sliding and fixing the finishing wheel holding mechanism when one of the finishing wheels in use has worn out. Therefore, finish processing can be promptly resumed. Furthermore, by fitting in advance different types of finishing wheels, the preparatory work for a different type of gear piece can be accomplished in a shorter period of time.

However, for the gear finishing apparatus described above, the finishing wheels are usually fixed by fitting a plurality of finishing wheels onto the internal circumferential surface of the finishing wheel holding mechanism, placing a fixing ring as to cover the external end face of the finishing wheel and the end face of the support gear, and fastening fixing bolts which penetrate the fixing ring and the finishing wheels and extendi to the inside of the support gear. Therefore, many fixing bolts have to be fastened along the fixing ring when fitting the finishing wheels. Further, when any of the finishing wheels is to be replaced, those fixing bolts should be loosened and fastened again after the replacement. Although the latter finishing wheel holding mechanism permits prompt resumption of finish processing because a new, already positionally adjusted finishing wheel can be brought to its working position when one of the finishing wheels in use has worn out, the problem of the time and labor consumed in fastening the fixing bolts remains unsolved.

Such problems are not limited to honing but also are commonly encountered in wheel finish processing, such as shaving or the like, using a finishing wheel having internal teeth.

Therefore, an object of the present invention is to provide a finishing wheel holding mechanism for a gear finishing apparatus using a finishing wheel having internal teeth, whose finishing wheel can be fitted and replaced easily and quickly.

SUMMARY OF THE INVENTION

In order to achieve the object stated above, according to the invention, there is provided a finishing wheel holding mechanism for a gear finishing apparatus which subjects to finish processing a gear piece engaged with a finishing wheel having internal teeth by turning the finishing wheel, provided with:

a head frame having at the center an opening portion for holding a finishing wheel and supported by the base portion of the gear finishing apparatus, and an annular finishing wheel holder permitting the fitting of a finishing wheel on the internal peripheral portion, supported within the opening portion of the head frame, and turned by a driving device within the opening portion, wherein the finishing wheel holder is provided with:

a support gear which has an open end portion at the end face for finishing wheel insertion and an accepting portion for accepting in a fixed position the finishing wheel inserted through the open end portion, and receives driving power from the driving device within the head frame, an annular shifting body which is supported by the internal peripheral portion of the support gear in the open end portion to be slidable in the axial direction of the support gear, and has an internal diameter slightly larger than the external diameter of the finishing wheel, a projection protruding in the support gear so as to serve as a stopper in contact with the insertion side end face of the finishing wheel inserted into the accepting portion, a pressing collar which is inserted, after the finishing wheel is inserted into the accepting portion, along the internal circumferential surface of the shifting body to be engaged in a locked state against coming off, and is pushed by the sliding of the shifting body toward the finishing wheel to come into contact with the end face of the finishing wheel to fix the finishing wheel, and an actuator provided in the support gear for driving the shifting body toward the accepting portion (Invention 1).

The finishing wheel holding mechanism according to Invention 1 may have a configuration wherein the support gear has in its internal circumferential surface an annular concave for accepting the shifting body to be slidable in the axial direction of support gear, and the actuator support gear is a hydraulic drive unit, the hydraulic drive unit being provided with a pressure portion for feeding working fluid and an oil passage for guiding the working fluid from the pressure portion to the concave so as to move the shifting body toward the accepting portion (Invention 2).

The finishing wheel holding mechanism according to Invention 2 may have a configuration wherein the pressure portion of the hydraulic drive unit is provided with an active piston mechanism disposed within the support gear and a pressing portion for pressing the piston of active piston mechanism (Invention 3).

The finishing wheel holding mechanism according to Invention 3 may have a configuration wherein the pressing portion has a female-threaded hole disposed in the support gear and reaching the piston and a male-threaded bolt screwed into the female-threaded hole and manipulable from outside (Invention 4).

The finishing wheel holding mechanism according to Inventions 1 through 4 may have a configuration wherein the support gear is provided with an indicative piston mechanism connected with the active piston mechanism, and the piston of the indicative piston mechanism is fitted with a rod-shaped indicator which protrudes from the end face of the support gear when the piston slides, receiving the working fluid from the active piston mechanism (Invention 5).

The finishing wheel holding mechanism according to Inventions 1 through 5 may have a configuration wherein the accepting portion is provided with an annular intermediate member whose internal diameter is slightly larger than the external diameter of the finishing wheel and which has notches for accepting balls in a plurality of positions in the circumferential direction, an annular recess for accepting the intermediate member to be slidable in the axial direction of the support gear, and centering balls which are accepted into the notches and whose depth of acceptance and diameter are so determined that the tangent circle connecting the innermost points of these balls have a diameter substantially equal to the external diameter of the finishing wheel, the bottom face of the annular recess being tapered from the open end portion for finishing wheel insertion toward the accepting portion (Invention 6).

The finishing wheel holding mechanism according to Inventions 1 through 6 may have a configuration wherein said intermediate member is arranged within said annular recess to be slidable toward the end face of the support gear to push said shifting body toward the end surface, and said support gear is provided with a port for supplying compressed air from outside and an air passage for guiding the compressed air to said annular recess to slid said intermediate member toward said end face of the support gear (Invention 7).

According to Invention 1, the finishing wheel holder supported by the base portion of the gear finishing apparatus and rotated within the opening portion of the head frame is provided with a support gear which has an open end portion for finishing wheel insertion and an accepting portion for accepting in a fixed position the finishing wheel inserted through the open end portion; an annular shifting body which is supported slidablly by the internal peripheral portion of the support gear in the open end portion; a projection protruding in the support gear so as to serve as a stopper in contact with the insertion side end face of the finishing wheel; a pressing collar which is inserted, after the finishing wheel is inserted, along the internal circumferential surface of the shifting body to be engaged in a locked state against coming off, and is pushed by the sliding of the shifting body toward the finishing wheel to come into contact with the end face of the finishing wheel to fix the finishing wheel; and an actuator for driving the shifting body toward the accepting portion. Therefore, by operating the actuator, the shifting body driven by the actuator pushes the pressing collar to bring it into contact with the end face of the finishing wheel and there by fixes the finishing wheel. Accordingly, manipulation to operate the actuator permits simple and quick fitting or replacement of the finishing wheel.

According to Invention 2, as the actuator which is a hydraulic drive unit causes working fluid from the pressure portion to work on the shifting body in the concave through the oil passage and thereby moves it toward the accepting portion of the support gear, the shifting body can be hydraulically driven by the operation of the actuator, resulting in very simple and quick operation.

According to Invention 3, as the hydraulic drive unit is provided with the active piston mechanism within the support gear the pressure portion for pressing the piston of the active piston mechanism, the actuator can be operated in accordance with the active piston mechanism by manipulating the pressing portion.

According to Invention 4, as the pressing portion is provided with a female-threaded hole disposed in the support gear and reaching the piston and a male-threaded bolt screwed into the female-threaded hole, the actuator can be operated by a simple manipulation of turning the male-threaded bolt. Further, as the hydraulic drive unit is accommodated in the support gear, there is no need to connect any oil passage from outside to rotating parts, enabling reliable operation to be achieved with a simple structure.

According to Invention 5, whether or not the finishing wheel is fixed can be judged by the extent of protrusion of the rod-shaped indicator fitted to the indicative piston mechanism connected with the active piston mechanism, and reliable operation is thereby ensured.

According to Invention 6, the finishing wheel is accurately centered by the centering balls accepted into the intermediate member. Further, as the bottom face of the annular recess for accepting the intermediate member is slightly tapered from the open end portion of the support gear toward the accepting portion, the centering balls come into increasingly strong contact with the finishing wheel as the finishing wheel is inserted deeper into the accepting portion. Therefore the finishing wheel can be readily inserted, and accurate centering can be accomplished by the completion of the insertion.

According to Invention 7, compressed air supplied from the port via the air passage slides the intermediate member in the annular recess, and the shifting body is thereby pushed toward the open end portion of the support gear. Therefore, the finishing wheel, fixed until then by the sliding of the intermediate member, is released from the fixation by the simple operation of supplying compressed air to the port, and can be easily taken out.

DETAILED DESCRIPTION OF THE PREFERRED EMBODIMENTS

Figure 1:
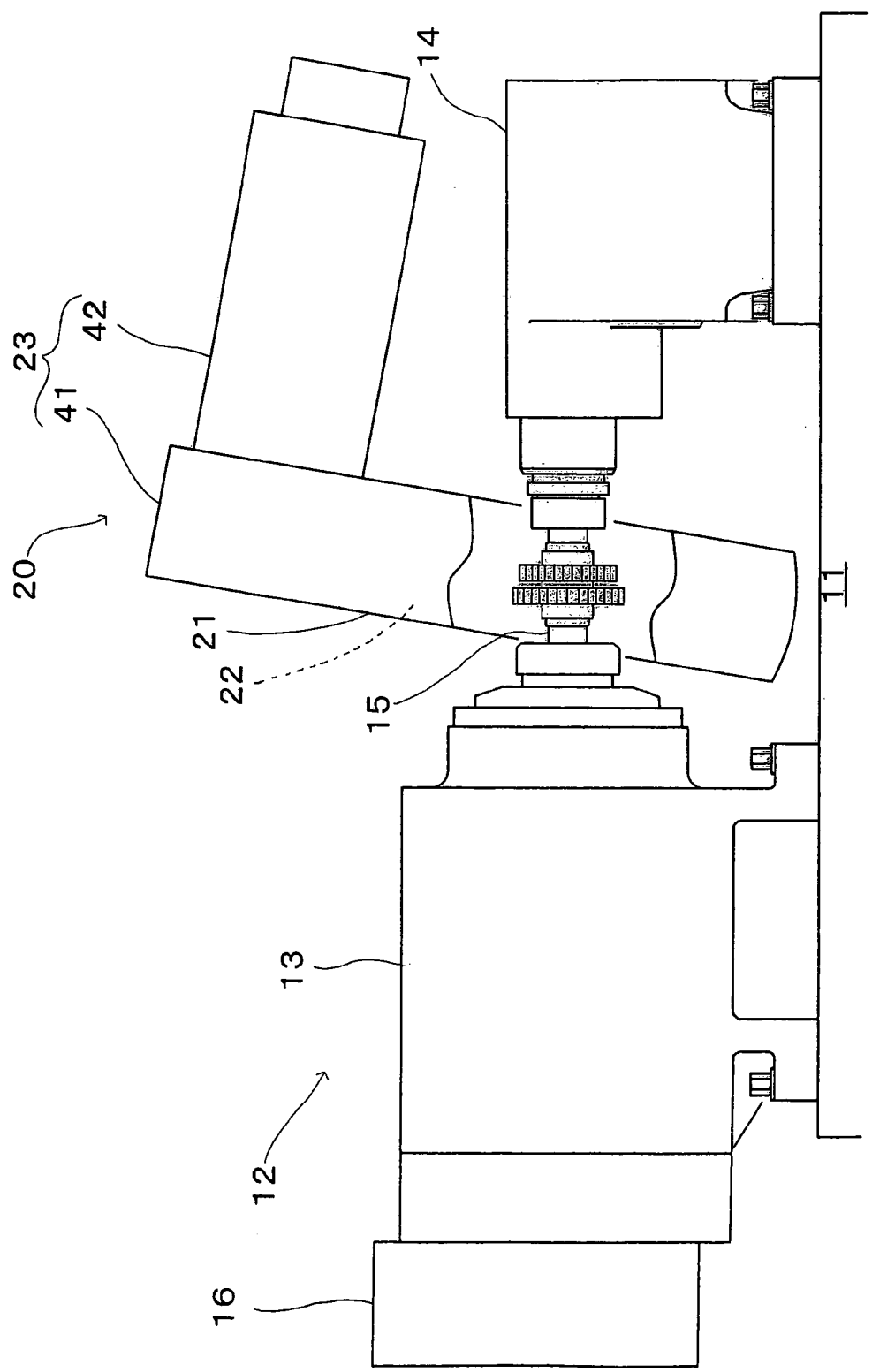
FIG. 1 shows a partial front view of a gear finishing apparatus provided with a finishing wheel holding mechanism, which is one preferred embodiment of the present invention.

A preferred embodiment of the present invention will be described below with reference to the accompanying drawings. FIG. 1 shows a partial front view of a gear finishing apparatus provided with a finishing wheel holding mechanism, which is one preferred embodiment of the present invention. The gear finishing apparatus is provided with a table 11 slid by a driving motor (not shown) and a work holder 12 arranged on the table 11. The work holder 12 is provided with two tail stocks 13 and 14 which can slide in parallel to the sliding direction of the table and a motor 16 for driving the shaft 15 of one tail stock 13 to rotate. This causes a work W to be held between the tail stocks 13 and 14 to be rotatable integrally with the shaft 15. Behind the table 11 (deeper beyond the sheet surface of FIG. 1), there is arranged a sliding section (not shown) so supported to be able to approach and retract in a direction substantially perpendicular to the axis of the tail stocks, and a finishing wheel holding mechanism 20 is fitted to the front end of the sliding section via a joint portion and an operating portion (not shown). The sliding section recedes when the work and any finishing wheel are to be replaced, and moves forward during processing so as to cause the finishing wheel to cut into the work. The joint portion has a function to turn the finishing wheel holding mechanism around an axis extending along the sliding direction of the sliding section so as to engage finishing wheels with a gear, which is to be the work W, at a crossing angle. The operating portion has a function to slide the finishing wheel holding mechanism in the axial direction of finishing wheels supported by the mechanism so as to cause a plurality of finishing wheels to successively arrive in their processing position. As these sliding section, joint portion and operating portion, known elements can be used, such as those used in the gear finishing apparatus described in the Japanese Unexamined Patent Publication No. 7-24634.

As described so far, this gear finishing apparatus performs a synchronous operation in which processing is accomplished while both the work W and finishing wheels are being driven.

Figure 2:
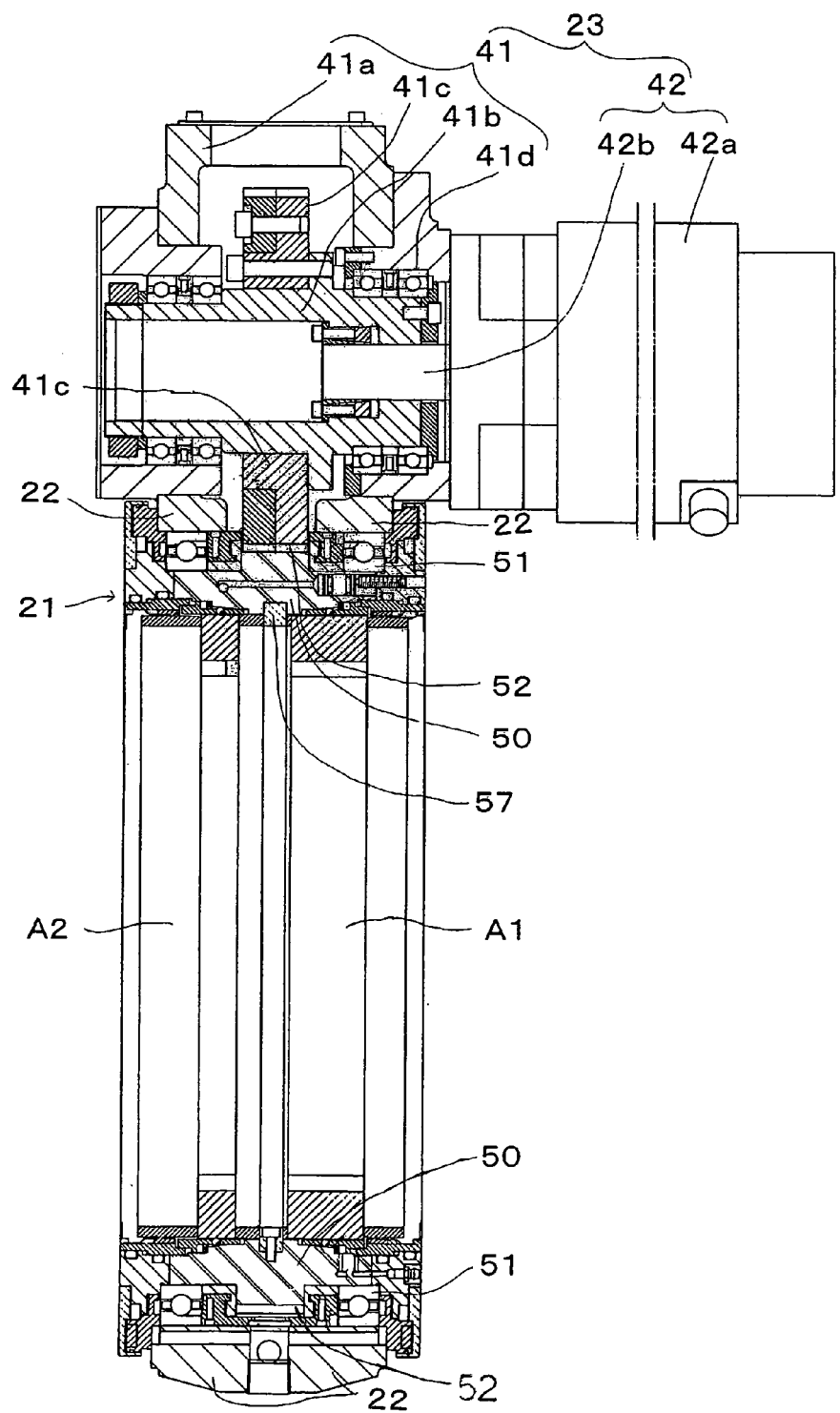
FIG. 2 shows a vertically sectioned side view of the finishing wheel holding mechanism shown in FIG. 1.

The finishing wheel holding mechanism 20, whose vertical section is shown in FIG. 2, is provided with a head frame 21 having at its center an opening portion for holding finishing wheels and supported by the base portion of the gear finishing apparatus, annular finishing wheel holding portions 22 permitting finishing wheels to be fitted onto their internal peripheral parts and supported in the opening portion of the head frame, and a driving device 23 for driving the finishing wheels in the finishing wheel holding portion to rotate. The driving device 23 is provided with a transmission unit 41 coupled to the head frame 21 and a driving unit 42 coupled to the transmission unit 41.

The transmission unit 41 is provided with a transmission frame 41a formed integrally with the head frame 21, a hollow intermediate shaft 41b supported with in the transmission frame 41a, a transmission gear 41c fastened to the circumferential surface of the intermediate shaft 41b, and a bearing 41d supporting the intermediate shaft 41b.

The driving unit 42 is provided with a motor 42a coupled to the transmission frame 41a and an output shaft 42b extending from the motor into the transmission frame 41a and coupled to the intermediate shaft 41b.

Figure 3:
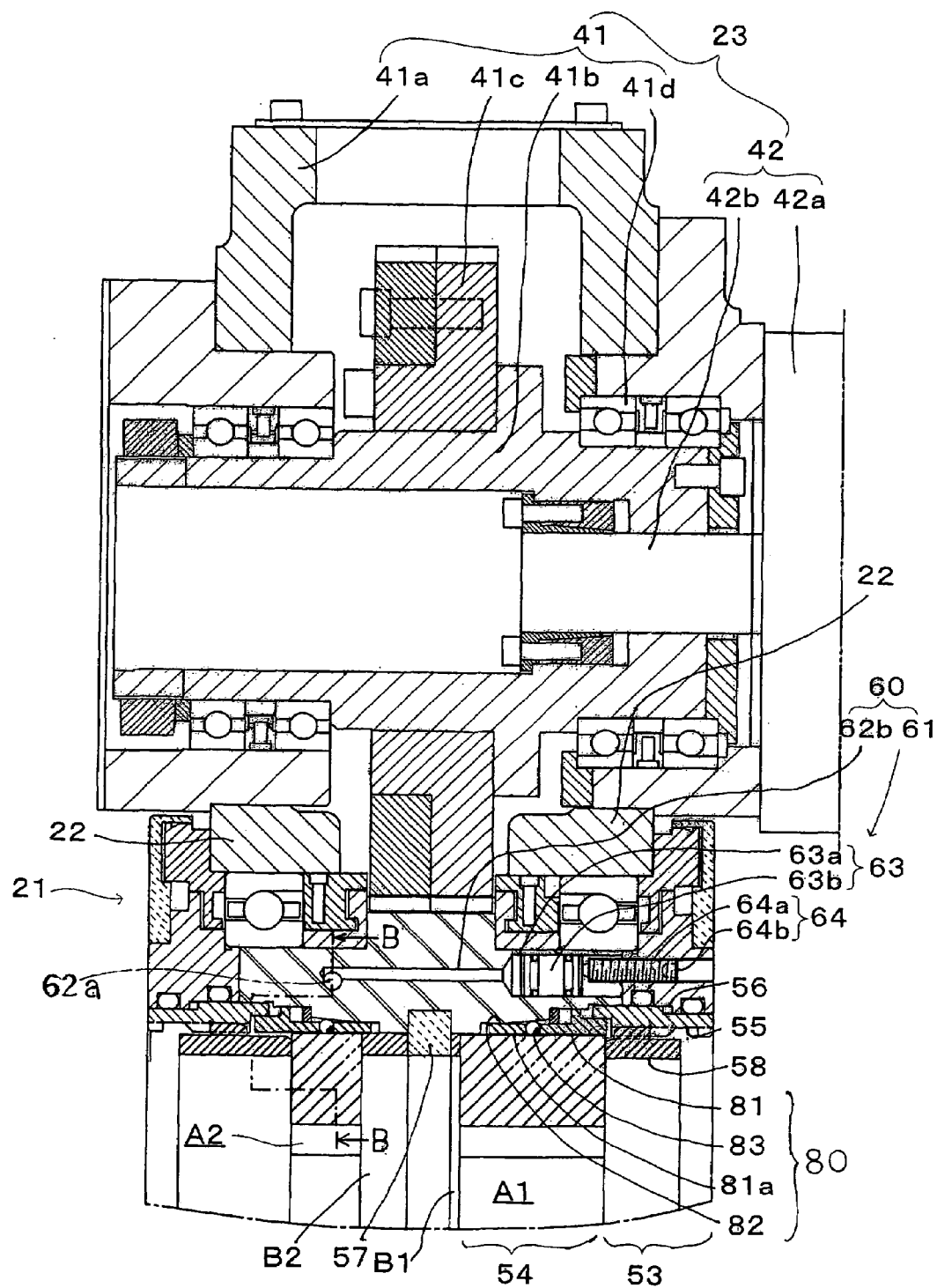
FIG. 3 shows an expanded view of the upper part of the finishing wheel holding mechanism shown in FIG. 2.

Two finishing wheel holding portions 22 are provided in this embodiment side by side in the axial direction of the head frame 21. In FIG. 2, two finishing wheel holding portions 22 for holding finishing wheels A1 and A2 are shown side by side, which are also shown in FIG. 3 illustrating an expanded view of the essential part of FIG. 2. These finishing wheel holding portions 22 are substantially symmetric although there are some dimensional differences. Therefore, the following description will be focused mainly on the finishing wheel holding portion 22 shown on the right hand side in FIG. 2.

Each of the finishing wheel holding portions 22 has a support gear 50 supported rotatably within the head frame 21. The support gear 50 is supported by a bearing 51 within the head frame 21, with its external teeth 52 being engaged with the transmission gear 41c of the driving device. the support gear 50 is rotated by a driving force received from the transmission gear. The support gear 50 is provided with an open end portion 53 for finishing wheel insertion on the side closer to the end face of the head frame 21 and an accepting portion 54 for accepting into a fixed position the finishing wheel inserted from the open end portion.

An annular shifting body 55 whose internal diameter is slightly larger than the external diameter of the finishing wheel A1 is fitted into the open end portion 53 for finishing wheel insertion. In the internal circumferential surface of the open end portion 53, there is formed an annular concave 56 for accepting the shifting body 55 to be slidable in the axial direction of the support gear.

On the internal circumferential surface of the support gear 50, there is further formed an annular projection 57 so protruding as to serve as a stopper by contacting an end face of the finishing wheel inserted into the accepting portion 54. The projection 57 is split into three pieces, for instance, in the circumferential direction, and the pieces are fixed to the support gear 50 with screws or the like to constitute a ring together.

Figure 6:
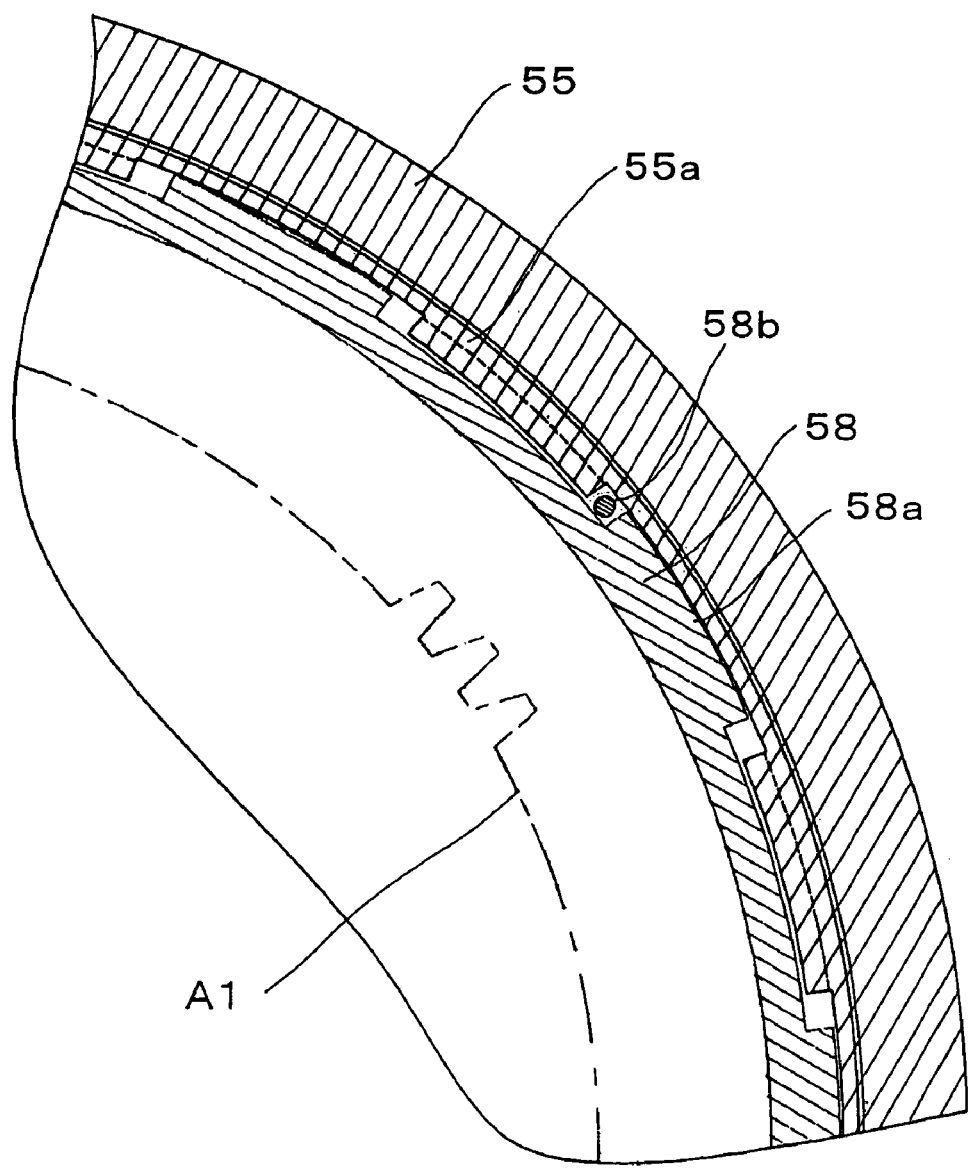
FIG. 6 shows a front view of the finishing wheel holding mechanism shown in FIG. 2 in a state in which a shifting body is not engaged with a support gear.
Figure 7:
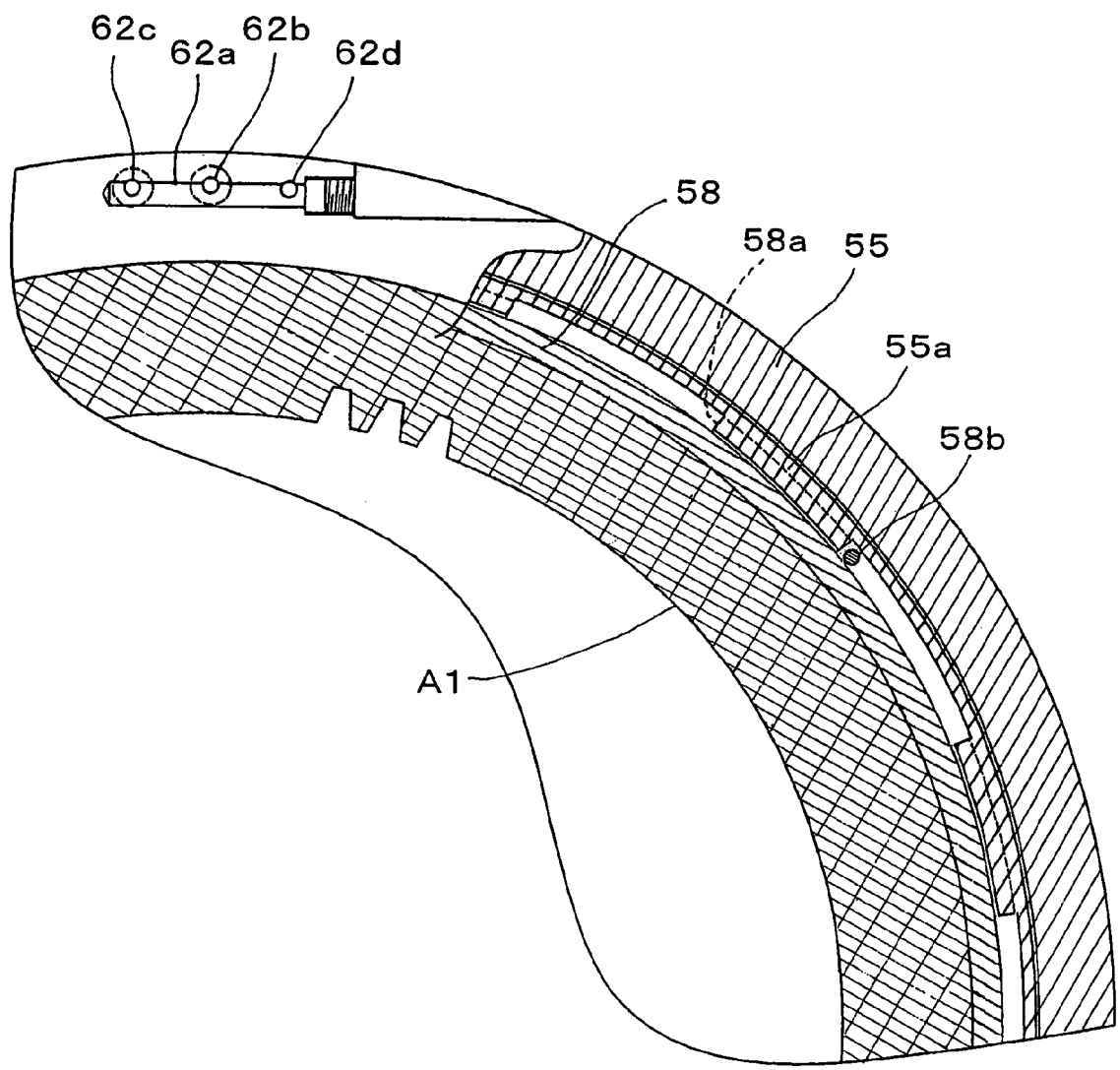
FIG. 7 shows a front view of the finishing wheel holding mechanism shown in FIG. 2 in a state in which the shifting body is engaged with the support gear.

In order to fix the finishing wheel A1 having been inserted into the accepting portion 54, a pressing collar 58 is inserted along the internal circumferential surface of the shifting body 55 and engages with the shifting body in a locked state against coming off. In this embodiment, the shifting body 55 and the pressing collar 58 constitute a bayonet joint. Thus, as shown in FIG. 6 and FIG. 7, the shifting body 55 and the pressing collar 58 are respectively provided with engaging pieces 55a and 58a extending along the corresponding internal and external circumferential surfaces. The engaging pieces are engaged with each other in the locked state against coming off by being turned in the circumferential direction after the insertion of the pressing collar 58. FIG. 6 shows a state in which the pressing collar 58 is inserted into the shifting body 55, and FIG. 7, an engaged state in which the pressing collar 58 is turned in the circumferential direction after being inserted. The pressing collar 58 is provided with a pin 58b which comes into contact with the engaging piece 58a when the engaging piece 55a has entered into an engaged state and an unengaged state, and the checkup of the operation is thereby facilitated. Alternatively, the engagement of the shifting body 55 and the pressing collar 58 in the locked state against coming off can as well be achieved in other various forms, such as screwing of a female thread and a male thread respectively provided on the two engaging pieces.

The finishing wheel holding mechanism 20 is further provided with an actuator 60, which is disposed in the support gear 50 and drives the shifting body 55 toward the accepting portion. In this embodiment, the actuator 60 is formed by a hydraulic drive unit. This hydraulic drive unit is provided with a pressure portion 61 for pressure-feeding working fluid, and oil passages 62a and 62b for guiding the working fluid from the pressure portion to the concave 56 so as to move the shifting body 55 toward the accepting portion. The oil passages partly shown in FIG. 3 lead to the end of the concave 56 nearer to the open end portion of the support gear via unillustrated parts. The pressure portion 61 is provided with an active piston mechanism 63 having a cylinder 63a and a piston 63b disposed within the support gear, and a pressing portion 64 for pressing the piston 63b. The pressing portion 64 is configured of a female-threaded hole 64a bored in the support gear and reaching the piston, and a male-threaded bolt 64b which is screwed into the female-threaded hole and can be manipulated from outside.

Figure 4:
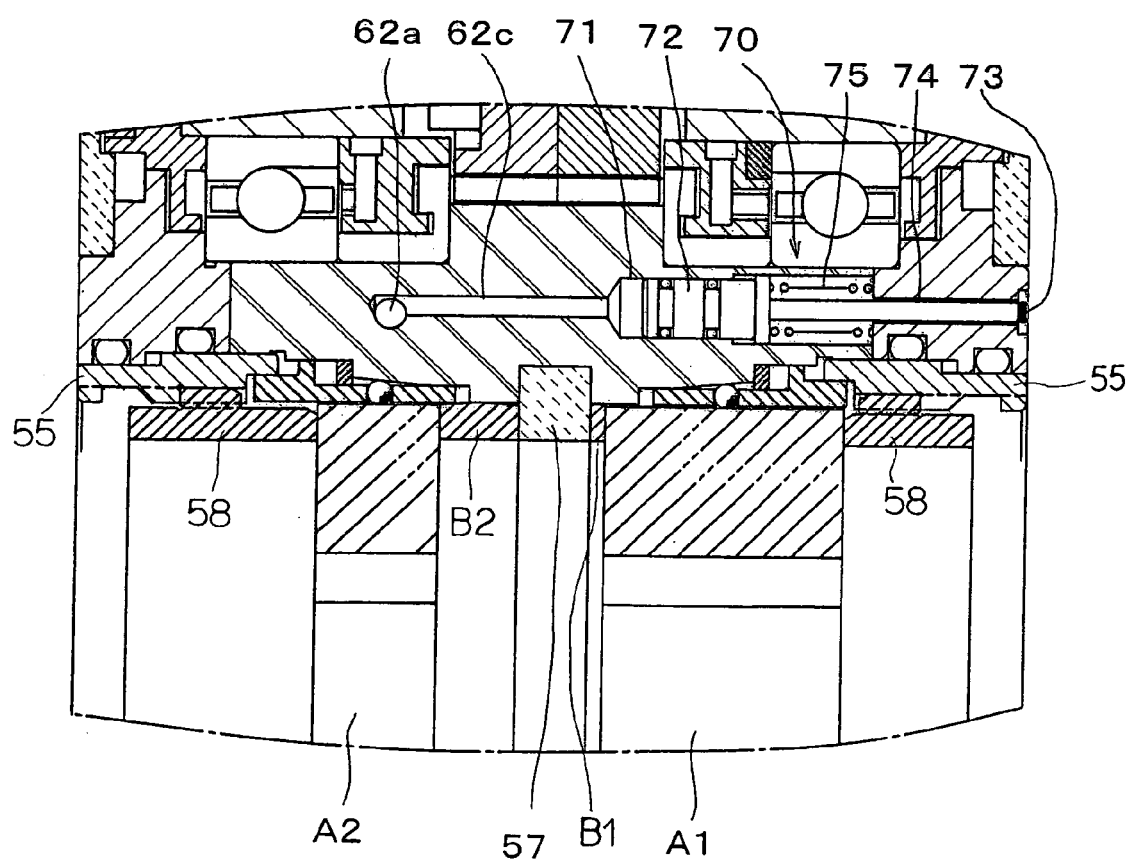
FIG. 4 shows mainly an expanded view of an indicator in the finishing wheel holding mechanism shown in FIG. 2.

As shown in FIG. 4, the support gear 50 is further provided with an indicative piston mechanism 70 connected with the active piston mechanism 63. The cylinder 71 of the indicative piston mechanism is formed in a position away from the active piston mechanism 63 in the circumferential direction, and is connected to the oil passage 62c which is in communication with the oil passage 62a described above. The piston 72 of the indicative piston mechanism 70 is fitted with a rod-shaped indicator 73 which receives pressure oil from the active piston mechanism 63 via the oil passages and, when the piston 72 has slid, protrudes from end face of the support gear 50 open end. The support gear 50 is formed with a hole 74 for receiving the indicator 73, and further fitted with a coil spring 75 to force the piston 72 toward the accepting portion 54.

Figure 8:
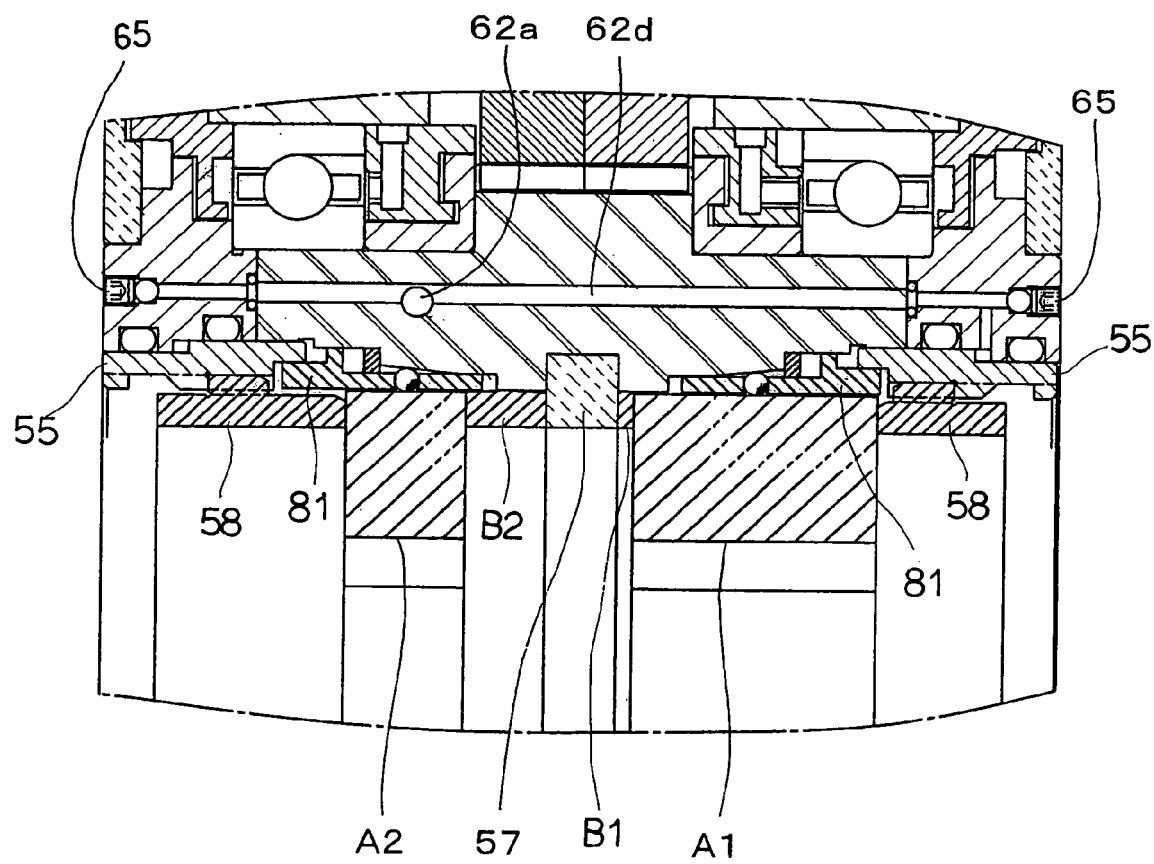
FIG. 8 shows a vertically sectioned side view of the upper part of the finishing wheel holding mechanism shown in FIG. 2.

FIG. 7 shows a sectional view along line B—B in FIG. 2. The oil passage of the actuator 60 is connected from the oil passage 62b extending in the widthwise direction of the support gear 50 shown in FIG. 3 to the oil passage 62a extending substantially in the circumferential direction shown in FIG. 7. The oil passage 62a is connected to the oil passage 62c for the indicative piston mechanism 70 to be described afterwards. The oil passage 62a is also connected to an oil passage 62d shown in FIG. 8. The oil passage 62d extends in the widthwise direction of the support gear 50 and is open to both end faces of the support gear 50. Its two ends are closed with detachable plugs 65. This oil passage 62d is used for replenishing oil and deaerating the oil passage.

As shown in FIG. 2, the accepting portion 54 in the support gear 50 is provided with a positioning mechanism 80 for centering a finishing wheel. The positioning mechanism 80 is provided with an annular intermediate member 81 whose internal diameter is slightly larger than the external diameter of the finishing wheel A1, and the intermediate member 81 has notches 81a for accepting balls, formed in a plurality of positions aligned in the circumferential direction. An annular recess 82 is formed in the accepting portion 54 to accept the intermediate member 81 to be slidable in the axial direction of the support gear. The notches 81a is tapered inward in the radial direction of the intermediate member 81, and centering balls 83 are so accepted in the notches 81a as to slightly protrude from the internal circumferential surface of the intermediate member 81. The depth of acceptance and diameter of these centering balls 83 are so determined that the tangent circle connecting the innermost points of these balls have a diameter substantially equal to the external diameter of the finishing wheel A1. The bottom face of the annular recess 82 is so tapered that its diameter slightly decrease from the open end portion 53 toward the accepting portion 54.

Figure 5:
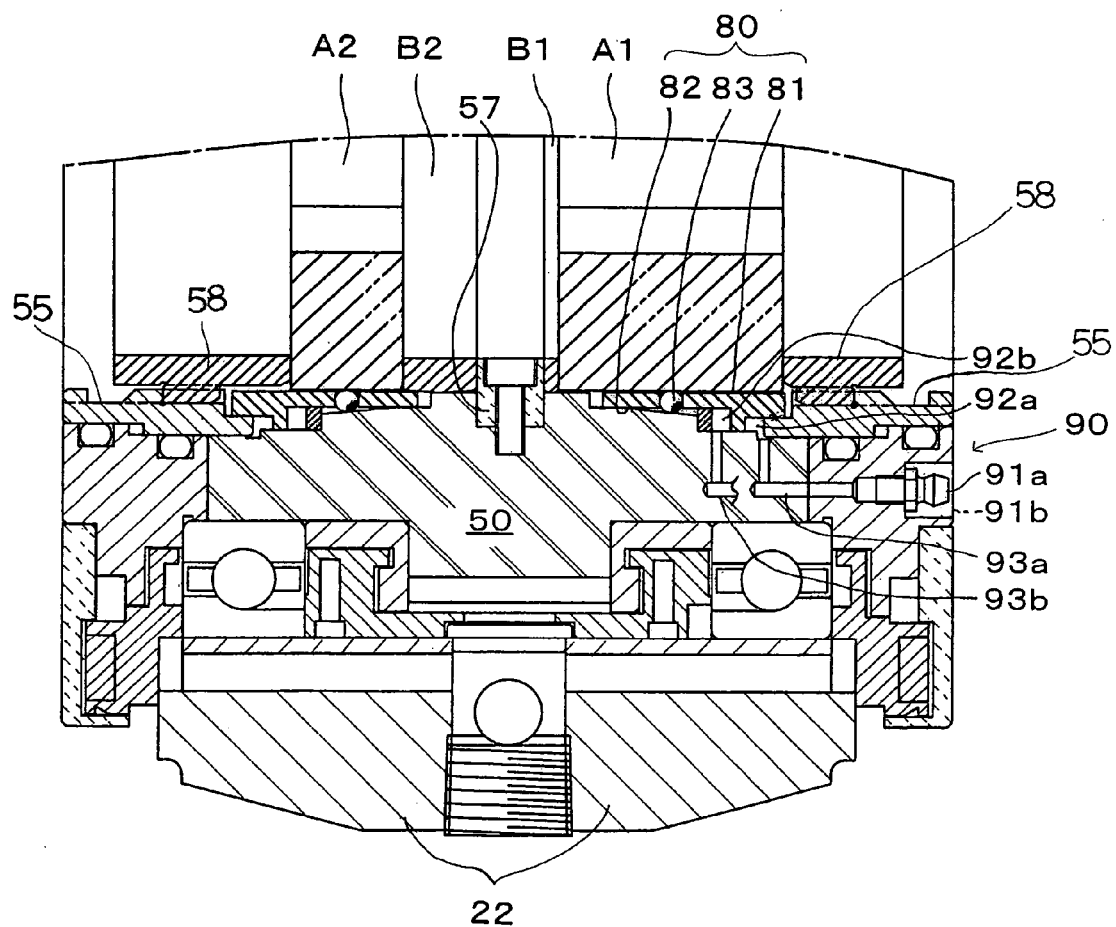
FIG. 5 shows mainly an expanded view of a pressure device in the finishing wheel holding mechanism shown in FIG. 2.

The finishing wheel holding mechanism 20 is further provided with a pressure device 90 for sliding the intermediate member 81 within the annular recess 82 in the axial direction of the support gear 50. For this reason, the support gear 50 has a first port 91a and a second port (behind the first port in FIG. 5, with its position represented by 91b) for supplying compressed air from outside. The first port 91a is connected to a first air passage 93a for guiding compressed air to an annular chamber 92a positioned at the end of the annular recess 82 nearer to the open end portion 53. The second port is connected to a second air passage 93b, for guiding compressed air to an annular chamber 92b at the end of the annular recess 82 nearer to the projection 57. The pressure device 90 moves the intermediate member 81 toward the projection 57 by supplying compressed air from the first port, and moves the intermediate member 81 toward the open end portion 53 by supplying compressed air from the second port. Further, the pressure device 90 is so configured as to push the shifting body 55 toward the open end portion 53 when the intermediate member 81 has slid within the annular recess 82 toward the open end portion 53.

In this embodiment, as described above, two finishing wheel holding portions 22 are disposed side by side, and they are substantially symmetric in basic structure with respect to the projection 57. Therefore, the shifting body 55, the pressing collar 58, the actuator 60, the indicative piston mechanism 70, the positioning mechanism 80, the pressure device 90 and so forth described with reference to the finishing wheel holding portion 22 on the right hand side in FIG. 2 through FIG. 5 are also disposed in the finishing wheel holding portion 22 on the left hand side in the drawings.

This finishing wheel holding mechanism 20 is used in the following manner. The oil passages 62a through 62d which constitute a closed circuit in a normal state are filled with oil. The projection 57 is fitted to the support gear 50.

If, for instance, the finishing wheel A1 is to be fitted to the finishing wheel holding portion 22 on the right hand side in FIG. 3, the male-threaded bolt 64b is retracted relative to the piston 63b in advance. Also, the intermediate member 81 is moved rightward in the drawing in advance by feeding compressed air to the second port 91b. These actions shift the shifting body 55 toward the end face of the support gear 50. The pressing collar 58 is removed in advance. In this state, a finishing wheel is inserted through the open end portion 53. Prior to this procedure, a spacer B1 of an appropriate thickness relative to the thickness of the finishing wheel is inserted.

When the finishing wheel A1 is inserted, the finishing wheel readily advances, with the external circumferential surface thereof being guided along the gap between the wheel and the intermediate member 81 of the positioning mechanism 80.

When the end face of the finishing wheel A1 and that of the projection 57 have come into contact with each other, compressed air is supplied through the first port 91a. This causes the intermediate member 81 to move within the annular recess 82 toward the projection 57, pressed by compressed air having reached the annular chamber 92a. As a result, the tapered bottom face of the annular recess 82 causes the centering balls 83 to come into strong contact with the circumferential surface of the finishing wheel A1 to center it accurately in relation to the support gear 50.

In a honing machine for gears, dressing of finishing wheels is often accomplished by fitting a gear-shaped tool having basic dimensions of gear pieces to the tail stock after fitting the finishing wheels to the finishing wheel holding mechanism with a view to eliminating fitting errors. According to the invention, since the finishing wheels are fitted with high precision, the quantity of cutting by dressing can be reduced, resulting in an additional advantage of shortening the length of time required for dressing.

After inserting the spacer B1 and the finishing wheel A1 into the accepting portion 54, the pressing collar 58 is inserted and turned, and its engaging piece 58a is engaged with the engaging piece 55a of the shifting body 55. This brings the pressing collar 58 to a position where it almost comes into contact with the end face of the finishing wheel A1.

In this state, the male-threaded bolt 64b is turned with a screw driver or the like in the forward direction. This causes the piston 63b of the active piston mechanism 63 to move forward, and the working fluid is pressure-fed, from the oil passage 62b, via the oil passage 62a and the subsequent passages, to the end of the annular concave 56 nearer to the open end portion 53 of the support gear 50. As a result, the shifting body 55 is pushed toward the accepting portion 54. As the shifting body 55 advances in this way, the pressing collar 58 is thereby pressed to apply pressure on the end face of the finishing wheel A1. As a result, the finishing wheel A1 is firmly held by the support gear 50. As the shifting body 55 is annular and is accommodated in the annular concave 56, the pressure of the working fluid uniformly works on the shifting body 55. Therefore, even if the actuator is configured of the active piston mechanism 63 in only one position, its manipulation can bring a pressing force for fixation all over the finishing wheels in the circumferential direction.

Along with the advance of the piston 63b, the working fluid acts on the indicative piston mechanism 70 via the oil passages 62c. This causes the piston 72 to retract toward the end face of the support gear 50 and, along with this, the indicator 73 is forced out of the end face of the support gear 50. As a result, the user can clearly know that the finishing wheel A1 has been fixed.

This manipulation is also applied, as required, to the finishing wheel holding portion 22 on the right hand side in FIG. 2. This completes the fitting of the finishing wheels.

Figure 9:
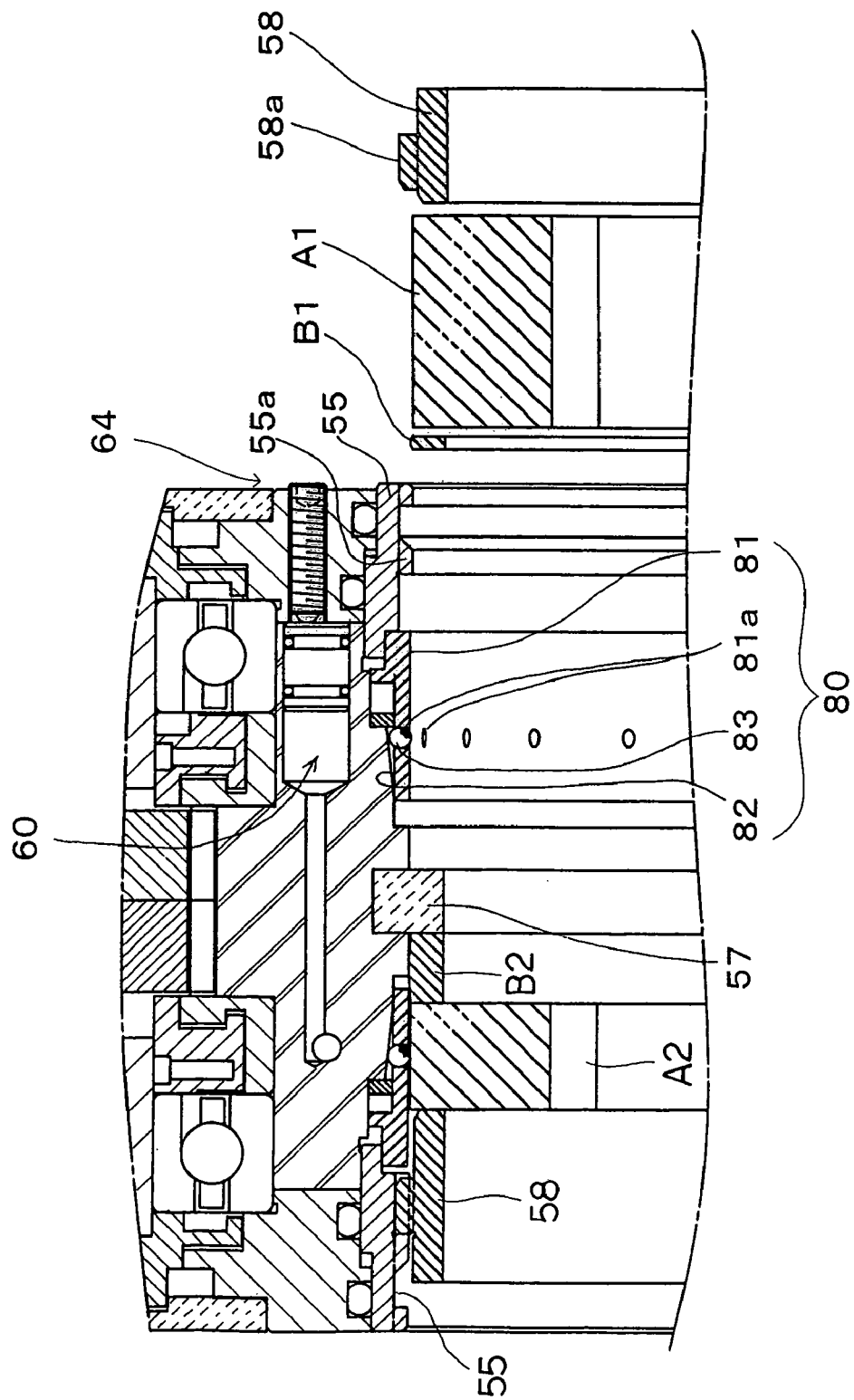
FIG. 9 shows a vertically sectioned side view of the finishing wheel holding mechanism shown in FIG. 2 in a state in which finishing wheels and other elements are removed.

A finishing wheel is removed in the following procedures. First, the male-threaded bolt 64b of the pressing portion 64 is turned to retract it toward the end face of the support gear 50. This releases the piston 63b of the active piston mechanism 63 from restraint. Then, a hose from the compressed air source is connected to the second port 91b of the pressure device 90, and compressed air is supplied. This causes the compressed air to reach the annular chamber 92b via the second air passage 93b, and pushes the intermediate member 81 toward the open end portion 53 of the support gear 50. As a result, the shifting body 55 is moved rightward in the drawing as the pressure of contact the centering balls 83 with the circumferential surface of the finishing wheel A1 is reduced with the assistance of the tapered bottom face of the annular recess 82. Then, the right end face of the intermediate member 81 comes into contact with the left end face of the shifting body 55. As this results in the formation of a gap between the finishing wheel A1 and the pressing collar 58, the pressing collar 58 is turned to disengage it from the shifting body 55. This enables the finishing wheel A1 to be readily taken out of the accepting portion 54. FIG. 9 shows a state in which the pressing collar 58, the finishing wheel A1 and the spacer B1 have been detached from the finishing wheel holding mechanism 20 in this way.

Where the finishing wheel holding mechanism 20 is provided with two finishing wheel holding portions 22 as in this embodiment, the processing can be continued, after one of the finishing wheels being worn out, with the other finishing wheel by sliding the head frame in its axial direction. Alternatively, if differing types are selected for the two finishing wheels fitted to the finishing wheel holding portions 22, different kinds of gear pieces can be worked upon without the need to replace the finishing wheel, and the required processing can be therefore accomplished rapidly. Alternatively, the finishing wheel holding mechanism 20 can be provided with only one finishing wheel holder.

Although the embodiment described above is provided with the male-threaded bolt 64b manipulable from outside as the pressing portion 64 for pressing the piston 63b of the active piston mechanism 63, one of various other power boosting mechanisms for pressing a piston can be used as well. For instance, the pressing portion may be provided with a lever mechanism for manipulating from outside a rod reaching the piston, and the piston can be moved by the turning of the lever. Alternatively, a hydraulic port may be provided, where a hydraulic hose can be connected to it to supply working fluid to the active piston mechanism to operate it. In this case, for free turning of the finishing wheel holder, it is preferable for the hydraulic horse to be detachable from the port.

The indicator for checking the fixation of the finishing wheels can be replaced by various kind of indicating means, such as a pressure sensor for detecting the pressure of the working fluid generated by the active piston mechanism or the contact pressures of operating members, and its output can be displayed.

Also, as the positioning mechanism for the centering of the finishing wheels, in place of the aforementioned one, any of various other appropriate ones can be used. For instance, a groove may be cut in the external circumferential surface of each finishing wheel, and a ring-shaped elastic member protruding from the groove may be fitted (Japanese Unexamined Patent Publication No. 11-58134).

The finishing wheel holding mechanism according to the present invention is not limited to the synchronous type described above, but the invention can as well be applied to a gear finishing apparatus in which the work W per se is not driven by a motor but turns together with the finishing wheel under the engagement therewith.

What is claimed is:

1. A finishing wheel holding mechanism for a gear finishing apparatus which subjects to finish processing a gear piece engaged with a finishing wheel having internal teeth by turning the finishing wheel, provided with:
- a head frame having at the center an opening portion for holding a finishing wheel and supported by a base portion of the gear finishing apparatus, and an annular finishing wheel holder permitting the fitting of a finishing wheel on the internal peripheral portion, supported within the opening portion of said head frame, and turned by a driving device within the opening portion, wherein
- the finishing wheel holder is provided with:
- a support gear which has an open end portion at the end face for finishing wheel insertion and an accepting portion for accepting in a fixed position a finishing wheel inserted through the open end portion, and receives a driving power from said driving device within said head frame,
- an annular shifting body which is supported by the internal peripheral portion of said support gear in said open end portion to be slidable in the axial direction of the support gear, and has an internal diameter slightly larger than the external diameter of a finishing wheel,
- a projection protruding in said support gear so as to serve as a stopper in contact with the insertion side end face of the finishing wheel inserted into said accepting portion,
- a pressing collar which is inserted, after the finishing wheel is inserted into said accepting portion, along the internal circumferential surface of said shifting body to be engaged in a locked state against coming off, and is pushed by the sliding of the shifting body toward the finishing wheel to come into contact with the end face of the finishing wheel to fix the finishing wheel, and
- an actuator provided in said support gear for driving said shifting body toward said accepting portion.

2. The finishing wheel holding mechanism according to claim 1, wherein said support gear has in its internal circumferential surface an annular concave for accepting said shifting body to be slidable in the axial direction of the support gear, and said actuator is a hydraulic drive unit,
- the hydraulic drive unit being provided with a pressure portion for feeding working fluid and an oil passage for guiding the working fluid from the pressure portion to said concave so as to move said shifting body toward said accepting portion.

3. The finishing wheel holding mechanism according to claim 2, wherein the pressure portion of said hydraulic drive unit is provided with an active piston mechanism disposed within said support gear and a pressing portion for pressing the piston of the active piston mechanism.

4. The finishing wheel holding mechanism according to claim 3, wherein said pressing portion has a female-threaded hole disposed in said support gear and reaching said piston and a male-threaded bolt screwed into the female-threaded hole and manipulable from outside.

5. The finishing wheel holding mechanism according to any one of claims 1 to 4, wherein said support gear is provided with an indicative piston mechanism connected with said active piston mechanism, and the piston of the indicative piston mechanism is fitted with a rod-shaped indicator which protrudes from the end face of said support gear when the piston slides, receiving the working fluid from said active piston mechanism.

6. The finishing wheel holding mechanism according to any one of claims 1 to 5, wherein said accepting portion is provided with an annular intermediate member whose internal diameter is slightly larger than the external diameter of the finishing wheel and which has notches for accepting balls in a plurality of positions in the circumferential direction, an annular recess for accepting the intermediate member to be slidable in the axial direction of the support gear, and centering balls which are accepted into said notches and whose depth of acceptance and diameter are so determined that the tangent circle connecting the innermost points of the balls has a diameter substantially equal to the external diameter of the finishing wheel, the bottom face of said annular recess being tapered from said open end portion for finishing wheel insertion toward said accepting portion.

7. The finishing wheel holding mechanism according to any one of claims 1 to 6, wherein said intermediate member is arranged within said annular recess to be slidable toward the end face of the support gear to push said shifting body toward the end surface, and said support gear is provided with a port for supplying compressed air from outside and an air passage for guiding the compressed air to said annular recess to slide said intermediate member toward said end face of the support gear.

* * * * *